(12) United States Patent
Stolz

(10) Patent No.: US 6,194,857 B1
(45) Date of Patent: Feb. 27, 2001

(54) ELECTROMOTIVE ACTUATOR

(75) Inventor: Christian Stolz, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/402,920

(22) PCT Filed: May 4, 1998

(86) PCT No.: PCT/DE98/01229

§ 371 Date: Oct. 13, 1999

§ 102(e) Date: Oct. 13, 1999

(87) PCT Pub. No.: WO98/52784

PCT Pub. Date: Nov. 26, 1998

(30) Foreign Application Priority Data

May 22, 1997 (DE) .............................. 197 21 338
Feb. 5, 1998 (DE) .............................. 198 04 409

(51) Int. Cl.$^7$ ................. B06J 7/05; H02P 1/22; H02P 7/00

(52) U.S. Cl. ............ 318/466; 318/469; 318/266; 318/484; 296/213; 296/214; 296/221

(58) Field of Search ................. 318/460–499, 318/260–283, 434; 49/26, 27, 28, 127; 296/223, 214, 216.03, 220, 107, 136, 221, 213, 216.02, 222

(56) References Cited

U.S. PATENT DOCUMENTS

| | | | |
|---|---|---|---|
| 4,634,945 | * 1/1987 | Takemura et al. | 318/469 |
| 4,893,870 | * 1/1990 | Moriya et al. | 296/223 |
| 5,372,401 | * 12/1994 | Odoi et al. | 296/214 |
| 5,864,214 | * 1/1999 | Brodsky | 318/282 |
| 5,951,100 | * 9/1999 | Ewing et al. | 296/214 |
| 5,952,801 | * 9/1999 | Boisvert et al. | 318/468 |
| 5,961,177 | * 10/1999 | Caye et al. | 296/213 |
| 6,054,822 | * 4/2000 | Harada | 318/434 |

FOREIGN PATENT DOCUMENTS 33 48 489 C2 * 5/1996 (DE) .

* cited by examiner

Primary Examiner—Paul Ip
(74) Attorney, Agent, or Firm—Michael J. Striker

(57) ABSTRACT

A process for operating an electric-motor drive is proposed for adjusting a sliding-lifting roof (16) in a motor vehicle by means of a signal processing arrangement (20), with a microprocessor (21) to which is fed an adjusting command (23) of an operating control (22) for a reference position of the sliding-lifting roof (16) as an actual state signal and at least one additional actual state signal of at least one arrangement (26, 32, 34, 52, 54) for detecting the actual position of the drive (10) and/or of the sliding-lifting roof (16), and which microprocessor (21) controls or regulates the drive (10) for moving the sliding-lifting rood (16) to its reference position, wherein the actual state signals are detected cyclically by the microprocessor (21) and a response is read out of a storage depending on the signal combination, wherein the response determines whether or not, and in what manner, the possible adjustments of the operating control (22) lead to a change in the present drive behavior via the signal processing arrangement (20).

19 Claims, 3 Drawing Sheets

ELECTROMOTIVE ACTUATOR

BACKGROUND OF THE INVENTION

An actuating device for sliding-lifting roofs in motor vehicles is already known from DE 33 48 489 C2, which actuating device has an operating control serving as a reference value transmitter for selecting an adjusting movement of a sliding-lifting roof cover. By actuating the operating control, the cover is adjusted to a desired or reference position in a sliding movement or a swiveling movement proceeding from a zero setting. A microcomputer carries out a comparison of the reference value and actual value and transmits control signals to a driving control depending on the regulation discrepancy between the actual position of the cover and the reference position adjusted at the reference value transmitter. A drive, as part of the position regulating circuit, adjusts the cover.

Other devices for operating an electric-motor drive which read out reference values and actual values successively (sequentially) are known commercially.

Further, in these devices every actuating or adjusting command sent by the operating control is first completed, wherein the sliding-lifting roof is moved into the corresponding reference position, before a new adjusting command which may have been issued in the interim can be executed (static transition).

SUMMARY OF THE INVENTION

Accordingly, it is an object of present invention to provide a process for operation g an electric-motor drive which avoids the disadvantages of the prior art.

In keeping with these objects and with others, one feature of represent invention resides, briefly stated in a process, in which the at least two state signals are detected cyclically by the microprocessor and at least one of a plurality of fixed responses is red out depending on the signal combination wherein the response determines whether or not, and in what manner the possible adjustments of the operating control lead to a change in the present drive behavior via the signal processing arrangement.

The process according to the invention has the advantage that an adjusting command, as an actual state signal, and at least one additional actual state signal are detected by a microprocessor cyclically, for example, every 10 milliseconds, and a response is read out without a delay depending on the combination of detected signals, wherein the response determines whether or not, and in what manner, the possible adjustments of the operating control carried out by the user lead to a change in the present drive behavior of the sliding-lifting roof.

This enables simultaneous evaluation of a plurality of actual state signals.

In connection with the above, a further advantage consists in that the drive of the sliding-lifting roof responds directly (after a debouncing period) to new adjusting commands (dynamic transition). By means of the process according to the invention, the sliding-lifting roof is adjusted to the reference value currently provided by an adjusting command within the shortest possible time insofar as this response is permissible in the present actual state of the sliding-lifting roof.

Advantageous further developments and improvements of the features indicated in the main claim are provided by the features indicated in the subclaims.

The actual state signals define a current actual state. The response is read out of a memory or storage depending on the actual state of the microprocessor and predetermines all possibilities for a permissible or impermissible transition from the current actual state to another possible actual state and/or the permissible or impermissible adjustments of the operating control, so that the user can, or can not, initiate a change in the drive behavior of the sliding-lifting roof.

It is further advantageous that different permitted reference positions which are to be moved to successively are provided as a response in case direct movement to the new reference position is not permitted due to the present actual state. For example, the sliding-lifting roof could be moved first into the closed position proceeding from the open position and then moved into the raised position selected via the adjusting command as reference position.

It is further advantageous that the response determined by the vehicle manufacturer, for example, is stored in coded form in a storage of the signal processing arrangement, for example, in the form of a function matrix in which the possibilities for operating the operating control (by the user) are assigned to the possible actual states or transitions from actual states. In this way, the information can be called up at any time by way of the established response.

There are three different responses: static, dynamic while motor is stopped, and dynamic while motor is running. Each response is preferably stored in a function matrix in the memory or storage.

Further, an error signal can be emitted as a response to a malfunction of the actual state signals, for example, an erroneous adjusting command (for example, a short circuit in the potentiometer of the operating control) or an operator key error. It is advantageous that no new reference position is determined and/or the drive is stopped when an error signal occurs. Further, the sliding-lifting roof can be closed manually by an emergency function when the error signal occurs.

In view of the various problems identified in sliding-lifting roofs, the correlation of the operating control respectively to the detected actual states and the static or dynamic response provided in connection therewith is a further advantage for testing function because the assignment can be conveniently displayed in tabular form.

Further, the process is adapted to a plurality of defined input values (actual state signals), but to only one output value (response). This results in a modular construction and in the advantage of simplified adaptation to different sliding-lifting roofs. In particular, only the detected actual states and the determined responses need be adapted to the respective design principle of the sliding-lifting roof and to the control possibilities of the operating control.

Finally, the actual states are defined in such a way that the sliding-lifting roof is actually in a defined actual state in every position.

BRIEF DESCRIPTION OF THE DRAWING

An embodiment example of the invention is shown in the drawing and is described more fully in the following description.

DESCRIPTION OF PREFERRED EMBODIMENTS

Figure 1:
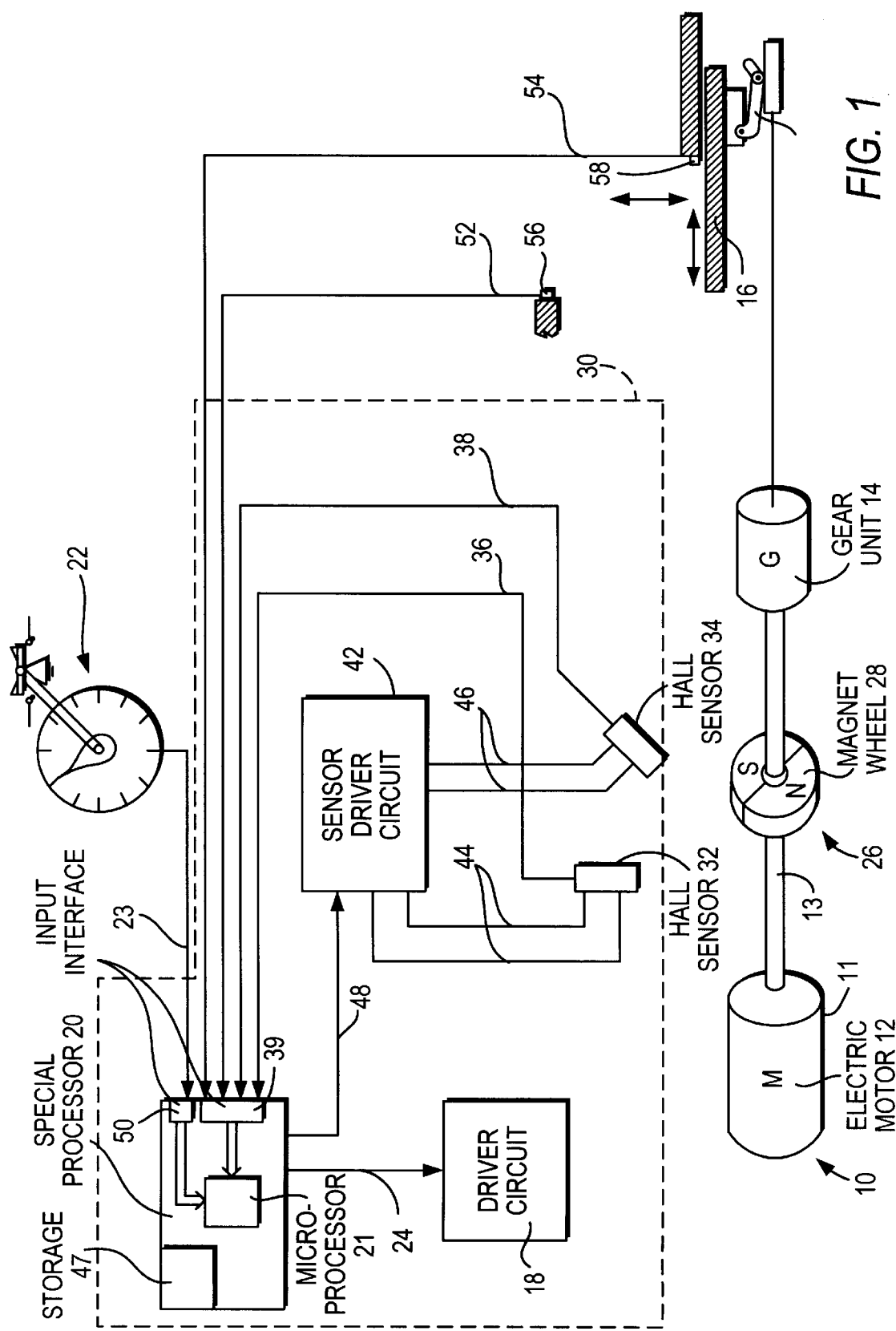
FIG. 1 shows a circuit diagram of a device realizing the process according to the invention.

The process according to the invention is realized in the device shown in FIG. 1. An electric-motor drive unit 10 with an electric motor 12 drives, via a gear unit 14, a sliding-lifting roof 16 with a crank linkage 17 which makes it possible to slide and lift the sliding-lifting roof 16 for a motor vehicle via a linear movement. The electric motor 12 has a rotor shaft 13 which rotates relative to the stator 11 of the electric motor 12.

A signal processing arrangement 20 controls and/or regulates the electric motor 12 depending on adjusting commands 23 which are given by an operating control 22 via a driver circuit 18. The driver circuit 18 supplies the electric motor 12 with power and determines the speed of the electric motor 12 and its rotating direction depending on a control signal 24 transmitted by the signal processing arrangement 20.

The electric motor 12 has an incremental position sensor 26 on a magnet wheel 28 or on a gear unit which is arranged on the rotor shaft 13 of the electric motor 12 so as to be fixed with respect to rotation relative to it, and two Hall sensors 32 and 34 which are arranged as magnetic field sensors at an angle of 90° or less in the circumferential direction of the magnet wheel 28 on an electronic board 30. Both Hall sensors 32, 34 are supplied with power by a sensor driver circuit 42 via lines 44, 46.

The signal processing arrangement 20 influences the sensor driver circuit 42 by an operating signal 48 and is capable of putting the Hall sensors 32, 34 into and out of operation by switching off their supply of power.

Sensor signals 36, 38 of the Hall sensors 32, 34 and sensor signals 52, 54 of two microswitches 56 and 58 are fed to the signal processing arrangement 20 via an input interface 39. Microswitch 56 is actuated when the sliding-lifting roof 16 is in the raised position. Microswitch 58 is actuated when the sliding-lifting roof 16 is in the closed position.

The sensor signals 36, 38, 52, 54 are prepared in the input interface 39 and fed to a microprocessor 21 with associated storage 47 of the signal processing arrangement 20 as actual state signals.

Further, an adjusting command 23 for giving reference values is fed to the signal processing arrangement 20 via an input interface 50 as an additional actual state signal, this adjusting command 23 being generated, for example, via a potentiometer serving as operating control 22 and prepared in the input interface 50. The potentiometer has 11 lock-in positions, wherein, for example, the zero setting corresponds to the closed position of the roof 16 and the additional ten settings correspond to reference positions of the sliding-lifting roof 16 in the sliding area.

The operating control 22 further has a rocker switch which can be actuated in the pulling and pushing direction with respect to tapping function (brief tapping) and touch function (tapping for longer than 400 milliseconds, for example). For example, the sliding-lifting roof 16 is automatically lifted into the raised position when actuated by tapping in the pushing direction. The potentiometer and rocker switch are connected with one another in such a way, for example, that the rocker switch can be actuated only in the zero setting of the potentiometer. Further, it is possible for the driver to operate the potentiometer and the rocker switch simultaneously so that only one adjusting command 23 is generated for a defined reference position of the sliding-lifting roof 16.

Figure 2:
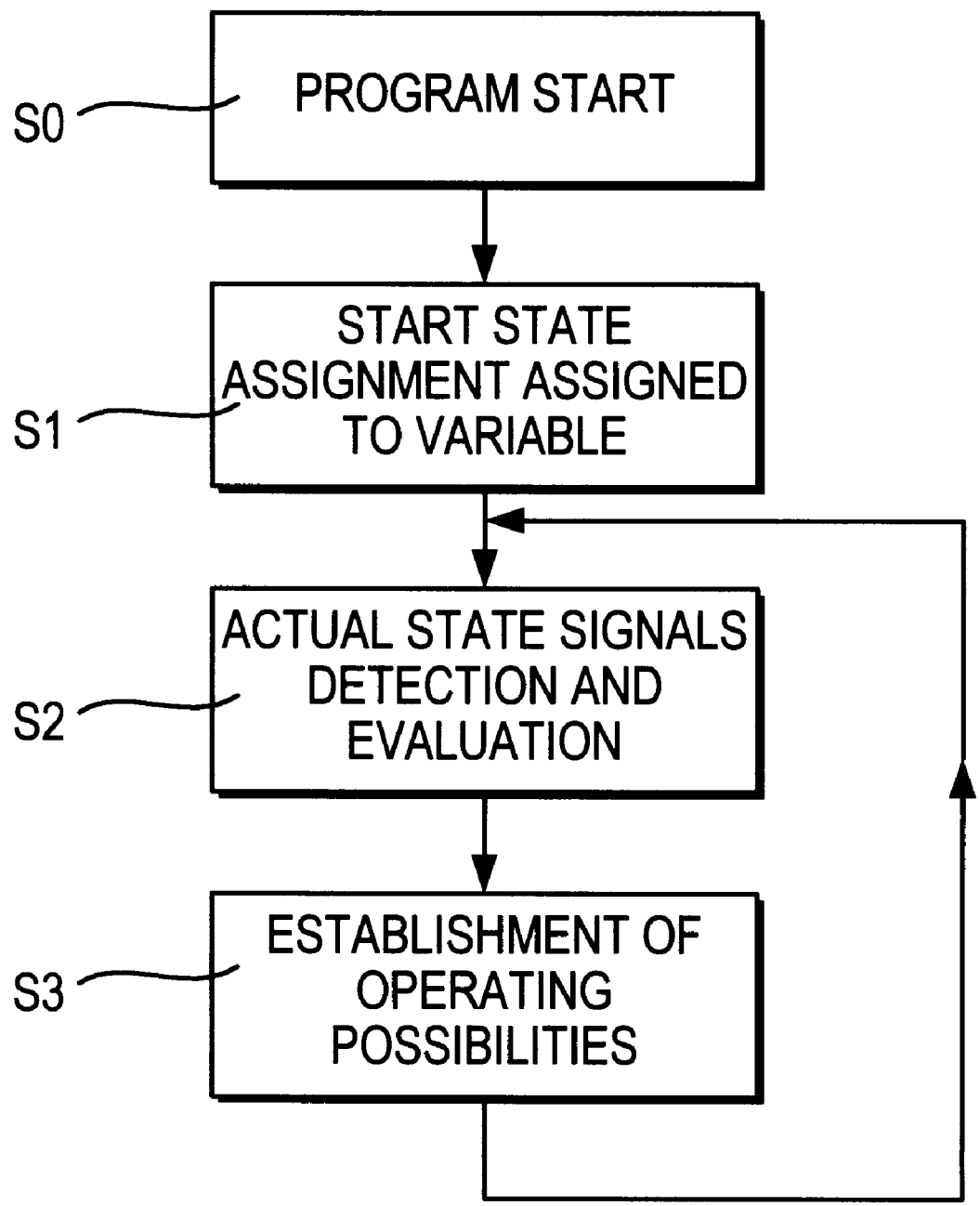
FIG. 2 shows a flow chart of the process according to the invention.

FIG. 2 shows four steps S0 to S3 describing the course of the process according to the invention which is to be carried out cyclically by the signal processing arrangement 20. The process is started in step S0 and a start state of the sliding-lifting roof 16 is detected in step S1. In the next step S2, the actual state signals are detected and evaluated and assigned to an actual state stored in the storage 47 according to FIG. 3. Starting from the determined actual state, a response is provided in step S3, i.e., the user (driver) can or can not initiate a change in the drive behavior of the sliding-lifting roof 16 by a corresponding actuation of the operating control 22 and can accordingly carry out or not carry out transitions from an actual state to another actual state (reference value preset).

Figure 3:
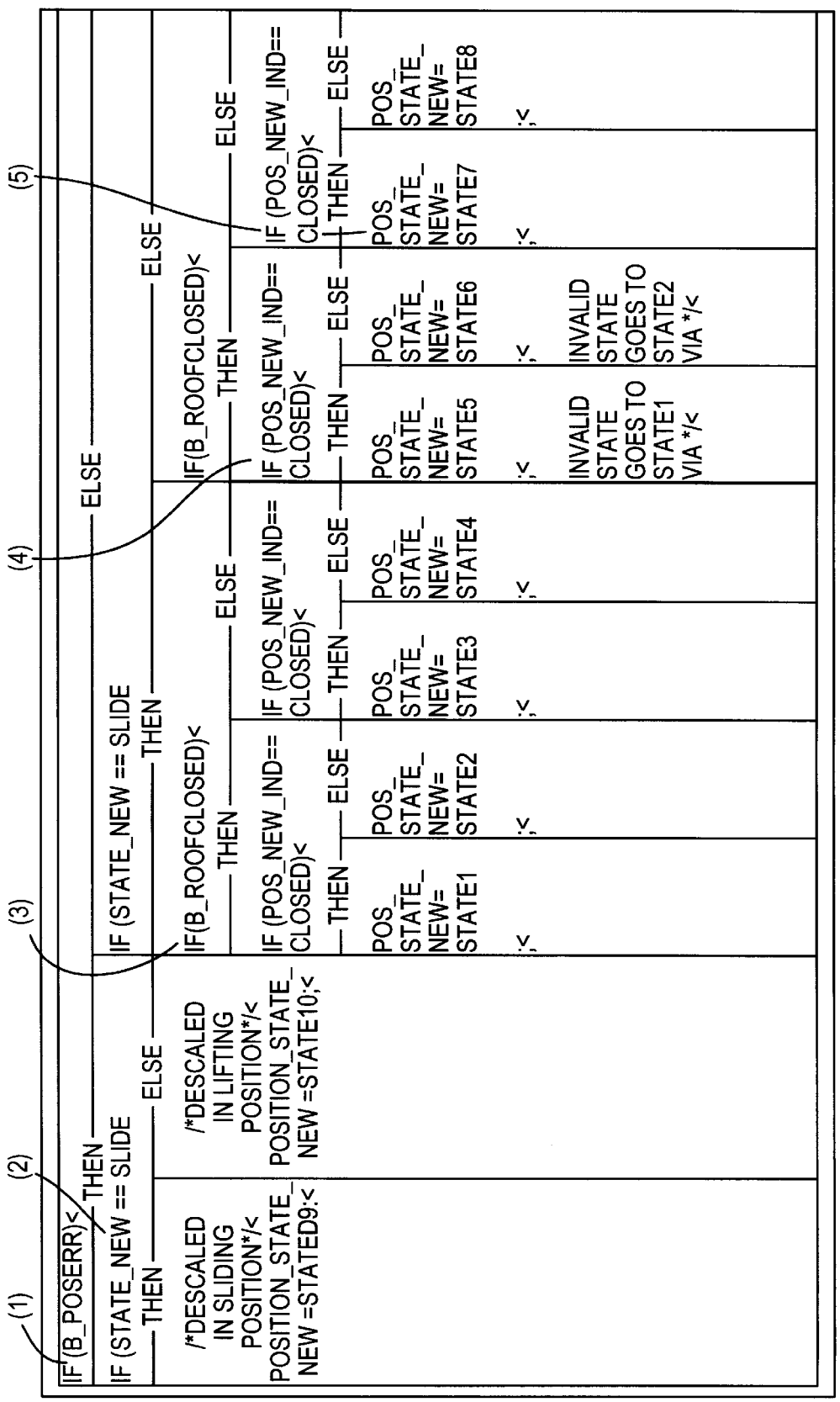
FIG. 3 shows a table of the actual states detected and defined on the basis of the actual state signals.

FIG. 3 shows possible defined actual states for a sliding-lifting roof 16 which are assigned depending on the actual state signals. The actual state signals depend on the actual position of the sliding-lifting roof 16 and, in particular, on the following factors:

1. the switching of the microswitches 56, 58;
2. further, the adjustment of the operating control 22 and the adjusting command 23 derived therefrom;
3. finally, the actual position of the sliding-lifting roof 16 determined by incremental position determination.

The actual state signals are evaluated in the signal processing arrangement 20 and, in accordance with FIG. 3, give the variables which are defined as follows:

(1) "B_poserr" is a Boolean variable which is detected by the microswitches 56, 58 or Hall sensors 32, 34 and which assumes the value "false" in a scaled state of the sliding-lifting roof and assumes the value "true" in a descaled state. A descaled state occurs, for example, prior to initialization of the sliding-lifting roof 16, after a watchdog reset, and after disconnecting the device from the power supply (terminal 30) of the motor vehicle or during manual adjustment of the sliding-lifting roof 16. The scaling takes place, e.g., during a first initialization run-through of the sliding-lifting roof 16.

(2) "State_new" is a variable which is likewise obtained by querying the switching state of the microswitches 56, 58 and represents information about whether the sliding-lifting roof 16 is in a sliding position or in a lifting position.

(3) "B_roofclosed" is likewise a Boolean variable which assumes the value "true" when the roof 16 is closed. This actual state signal is detected by the microswitches 56, 58.

(4) Finally, there is an integral value "pos_new_ind" which represents the adjustment of the operating control. In particular, a lock-in setting, e.g., zero setting, of the potentiometer is shown by the value "roof-CLOSED".

Every realizable combination of actual state signals and variables (1) to (4), respectively, gives a defined actual state which is represented by a variable "position_state_new" (5). This variable assumes the values state 1 to state 10, for example, which are defined in the table according to FIG. 3 for a construction of the sliding-lifting roof 16. The quantity and definition of the actual states (5) depends on the construction of the sliding-lifting roof and of the operating control 22 and can therefore be expanded optionally for other types of realizations.

The process according to the invention is described in the following in relation to FIG. 2 with reference to FIGS. 1 and 3:

Step S0:

The start of the program is triggered in particular when the driver of the motor vehicle actuates the ignition key (terminal 15) or during initialization of the sliding-lifting roof 16 (terminal 30). The sliding-lifting roof 16 is accordingly activated and can be actuated by the user via the operating control 22.

Step S1:

A start state is assigned to the variable for the actual state "position_state_new" (5). During the start state, the sensor signals 52, 54, 36, 38 of the microswitches 56, 58 and the Hall sensors 32, 34 are read in. Further, no response is permitted within a debouncing period.

Step S2:

The microprocessor 21 cyclically—approximately every 10 microseconds—detects the actual state signals of the sensors 32, 34, 56, 58 and operating control 22, evaluates these and assigns the actual state signals and variables (1) to (4) to one of ten possible actual states (5) depending on the signal combination.

Step S3:

Depending on the actual state, the microprocessor 21 reads out of the storage the response which is stored therein for this actual state. The response determines whether and in what manner the drive 10 of the sliding-lifting roof 16 responds to an adjustment of the potentiometer and/or a pulling or pushing actuation of the rocker switch. All permissible and impermissible transitions from the current actual state to other actual states and the permissible and impermissible operating possibilities of the operating control 22 are established as a response. In this respect, a distinction is made between static or dynamic responses when the motor 12 is stopped and when it is running, as will be explained hereinafter.

For example, the drive is in state 4 according to FIG. 3, i.e., the drive unit 10 is scaled and in a sliding position. Further, the sliding-lifting roof 16 is opened and the operating control 22 does not send an adjusting command 23 "roof_CLOSED", i.e., it is not in the initial position.

The static response to state 4 allows the following:

1. When the driver sets the adjusting command 23 "roof_CLOSED" by means of the operating control 22, the closed sliding-lifting roof position is moved to as reference position. In so doing, the variable "pos_new_ind" (4) assumes the corresponding value, state 4 passes into state 3 according to FIG. 3.
2. If the driver adjusts another position of the sliding position via the potentiometer serving as operating control 22, the sliding-lifting roof 16 moves into this position.
3. If the driver actuates the rocker switch in touch function in the pulling direction, the emergency function is activated and the sliding-lifting roof 16 can be adjusted manually into its closed position by the driver of the vehicle.

Any further actuations of the rocker switch serving as operating control 22, e.g., tapping function in the pushing direction for controlling the lifting position, are not allowed and are therefore not carried out by the signal processing arrangement 20. If the driver does not actuate the operating control 22, no adjustment of the sliding-lifting roof 16 takes place.

If the driver adjusts the operating control 22 to the adjusting command 23 "roof_CLOSED" (state 3), the signal processing arrangement 20 sends a control signal 24 to the driver circuit 18 of the electric motor 12 in order to move into the closed sliding-lifting roof position as reference position (state 1). During this time, a dynamic response, as it is called, is read out.

If the electric motor 12 is still stationary (dynamic response when motor is stationary), for example, during the starting delay of the potentiometer (500 milliseconds), another adjustment of the potentiometer within this time period causes another corresponding sliding-lifting roof position to be detected as a new reference position by the signal processing arrangement 21 and this is taken into account immediately irrespective of the first adjusting command 23. The emergency function and the actuation of the rocker switch for moving the sliding-lifting roof 16 into its lifting position are likewise permitted.

After the starting delay of the potentiometer 22 and while the motor 12 is running (dynamic response while motor is running), the sliding-lifting roof 16, according to the adjusted reference position, is moved into its closed position. If the potentiometer is adjusted again to another reference position of the sliding-lifting roof 16 during the adjusting process, the other corresponding sliding-lifting roof position is immediately detected as a new reference position by the signal processing arrangement 21 and is moved to directly irrespective of the first adjusting command 23. During this time, activation of the emergency function is no longer permitted because the emergency function should not interrupt the automatic adjustment of the sliding-lifting roof 16. Only the rocker switch may be actuated for adjusting the sliding-lifting roof 16 to a raised position. The process according to the invention is continued in step S2.

The sliding-lifting roof 16 therefore responds dynamically to new adjusting commands 23 because the sliding-lifting roof 16 is moved to the currently given reference value (dynamic transition) by an adjusting command 23 within the shortest possible time.

In case it is not permissible to move directly to the new reference position given by the driver due to the present actual state (e.g., from state 4 to state 8), different reference positions which are to be moved to successively are given as response. For example, the sliding-lifting roof 16 could first be moved to the closed position and then into the reference position selected by the adjusting command 23.

As was already described in the preceding, the microprocessor 21 detects the actual state signals of the sensors 32, 34, 56, 58 and of the input means 22 and reads out the response. In case of malfunction of the operating control 22 or an operating error, however, erroneous signals occur which are detected by the state logic of the microprocessor 21. The response assigned to an error signal does not result in the fixing of a new reference position for the sliding-lifting roof 16; rather, the previously valid reference position is retained and/or the drive 10 is stopped. Further, the sliding-lifting roof 16 can be closed manually via the emergency function when the error signal occurs.

In another development of the embodiment example, only one microswitch 58 is used, which is actuated, for example, when the sliding-lifting roof 16 is in a closed state. For this purpose, a position of the sliding-lifting roof 16 is exactly defined by the switching of the microswitch 58 during the transition of the sliding-lifting roof 16 from the closed state to the sliding position. The further positions are determined by the evaluation of the sensor signals 36, 38 of the Hall sensors 32, 34 and are written into variables "B_poserr" (1), "state_new" (2) and "B_roofclosed" (3) by the microprocessor 21.

Finally, microswitches can be done away with entirely when a mechanical stop of the sliding-lifting roof 16, e.g., the opened lifting position, is utilized for scaling (for example, position counter is set to zero) and further determination of position and rotating direction is carried out by the hall sensors 32, 34.

What is claimed is:

1. A process for operating an electric-motor drive for adjusting a sliding-lifting roof in a motor vehicle by means of a signal processing arrangement with a microprocessor, the process comprising the steps of feeding an adjusting command of an operating control for a reference position of a sliding-lifting roof to the microprocessor as a state signal; feeding at least one additional state signal to the microprocessor of at least one arrangement for detecting an actual position of the drive and/or of the sliding-lifting roof; controlling by the microprocessor the drive for moving the sliding-lifting roof to its reference position; detecting the at least two state signals cyclically by the microprocessor; reading out at least one of a plurality of fixed responses depending on a signal combination, so that a response determines whether or not, and in what manner, possible adjustments of the operating control lead to a change in a present drive behavior via the signal processing arrangement.

2. A process as defined in claim 1; and further comprising the step of storing the fixed responses in coded form in a storage of the signal processing arrangement.

3. A process as defined in claim 1; and further comprising the steps of detecting by the microprocessor a malfunction in the state signals; and generating an error signal.

4. A process as defined in claim 3; and further comprising the step of fixing no new reference position when the error signal is generated.

5. A process as defined in claim 3; and further comprising the step of stopping the drive when the error signal is generated.

6. A process as defined in claim 1; and further comprising the step of defining an actual state depending on the detected state signals; and reading out the response out of a storage depending on an actual state of the microprocessor.

7. A process as defined in claim 1; and further comprising the step of determining a plurality of reference positions which are to be moved successively as responses in a table.

8. A process as defined in claim 1; and further comprising the step of determining a plurality of reference positions which are to be moved successively as responses in a function matrix.

9. A process as defined in claim 1; and further comprising the step of selecting the state signals so that they depend on at least one of the conditions selected from the group consisting of a setting of the operating control and the adjusting command derived therefrom as reference value preset, a switching state of at least one microswitch which is actuated in a partial area of a movement area of the sliding-lifting roof to detect the actual position of the sliding-lifting roof and sensor signals of means arranged at the drive; and sensor signals of means arranged at the sliding-lifting roof for detecting an actual position of the sliding-lifting roof.

10. A process as defined in claim 9; and further comprising the step of using a counter as the means of detecting the actual position; incrementing or decrementing the counter depending on a number of revolutions detected by at least one Hall sensor with an associated magnetic pole wheel and on a rotating direction of a rotor shaft of the drive.

11. A process as defined in claim 1; and further comprising the step of forming a first variable from the state signals, which indicates whether or not the lifting-lifting roof is scaled or descaled with reference to a reference position.

12. A process as defined in claim 1; and further comprising the step of forming a second variable from the state signals, which indicates whether the sliding-lifting roof is in a sliding position or in a lifting position.

13. A process as defined in claim 11; and further comprising forming a third variable from the state signals, which indicates whether the sliding-lifting roof is closed or open.

14. A process as defined in claim 1; and further comprising the step of forming a fourth variable from the state signals which indicates a setting of the operating control selected from the group consisting of a potentiometer and a rocker switch.

15. A process as defined in claim 1; and further comprising the step of evaluating a partial area in which at least one microswitch of the arrangement is actuated as a transitional area between a sliding position and a lifting position of the sliding-lifting roof.

16. A process as defined in claim 1; and further comprising the step of evaluating a partial area in which at least one microswitch of the arrangement is actuated as an end position of the sliding-lifting roof.

17. A process as defined in claim 1; and further comprising the step of providing the cyclic detection of the state signals by the microprocessor after a predeterminable waiting period for debouncing of electrical inputs.

18. A process as defined in claim 1; and further comprising the step of using at least one potentiometer with lock-in positions as the operating element.

19. A process as defined in claim 1; and further comprising the step of using at least one rocker switch as the operating element.

* * * * *